United States Patent [19]

Paganini et al.

[11] 4,420,751

[45] Dec. 13, 1983

[54] DETECTION METHOD AND APPARATUS FOR A USER DEVICE OR AUTOMATIC TELLER BANK MACHINE

[75] Inventors: Bruno J. Paganini, Centerville; William J. Hale, Dayton, both of Ohio

[73] Assignee: NCR Corporation, Dayton, Ohio

[21] Appl. No.: 316,378

[22] Filed: Oct. 29, 1981

[51] Int. Cl.³ .................. H04Q 9/00; G08B 13/00
[52] U.S. Cl. .................. 340/825.33; 367/136; 367/96; 235/379
[58] Field of Search .................. 340/825.33; 235/375–382; 367/94–96, 129, 136; 343/5 PD, 112 D, 113 DE, 12 R

[56] References Cited

U.S. PATENT DOCUMENTS

| Re. 30,719 | 8/1981 | Mills | 367/96 |
|---|---|---|---|
| 3,893,094 | 7/1975 | Thorson et al. | 367/96 |
| 3,986,182 | 10/1976 | Hackett | 367/94 |
| 4,001,771 | 1/1977 | Amrine et al. | 367/136 |
| 4,051,472 | 9/1977 | Albanese et al. | 343/5 PD |
| 4,121,192 | 10/1978 | Wilson | 367/136 |
| 4,193,073 | 3/1980 | Kohmen | 343/112 D |

*Primary Examiner*—Donald J. Yusko
*Attorney, Agent, or Firm*—J. T. Cavender; Albert L. Sessler, Jr.

[57] ABSTRACT

A method and apparatus are disclosed for detecting (ultrasonically or eletromagnetically) events of the presence and movement of a user within a defined user area, and a user operating zone within the user area, associated with a user device, such as an automatic teller bank machine, and for providing output signals indicative of those events. Transducer transceiver means is utilized with ranging circuit means and distance measuring circuit means. A computer means coupled to the distance measuring circuit means is also utilized to provide the output signals which may be used to control the operation of the user device and effect any corrective measures deemed desirable during its operation.

20 Claims, 16 Drawing Figures

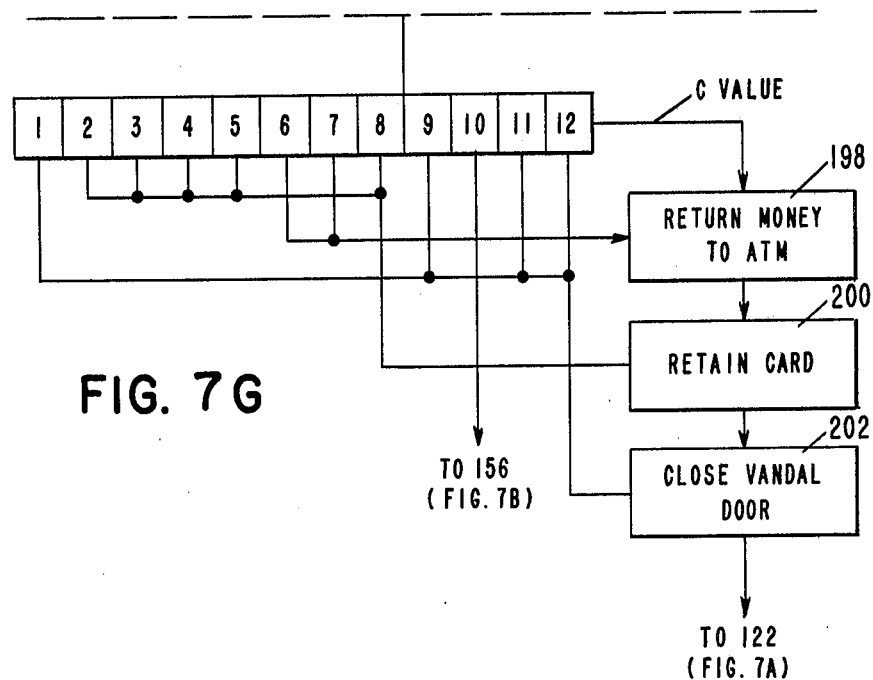

DETECTION METHOD AND APPARATUS FOR A USER DEVICE OR AUTOMATIC TELLER BANK MACHINE

BACKGROUND OF THE INVENTION

This invention relates to a user detection method and apparatus for an automatic teller machine (ATM) or other user device.

The operating strategy of Commercial Banks and Thrift Institutions to compete for increased market share by providing expanded customer service, and the need to reduce labor costs by the utilization of automated equipment have been strong forces that have hastened the investment in and the proliferation of the use of automatic teller machines (ATMs). These publicly-operated terminals typically provide banking services twenty-four hours per day and, being operated by the account holder, do not require the participation of an employee of the financial institution in the normal operation of the ATM. Because of the wide availability of ATMs to account holders relative to location as well as hours of operation, their capability to process a broad range of financial transactions, and their ease of use, the ATM concept has attained considerable public acceptance.

However, as is to be expected when an exceedingly complex machine is being operated by the general public, certain problems in the use of an ATM do occur. The manufacturer of an ATM strives to design the machine in such a way that the actions of the public user do not compromise the ability of the ATM to continue to perform financial transactions, while maintaining accurate control of the information, money, and bank cards (e.g., credit cards, debit cards) involved in the transaction. In addition to insuring the accuracy, confidentiality, and security of the financial transaction, the ATM must provide the untrained user with sufficient instructions to allow the user to successfully consummate the desired transaction, e.g., Cash Withdrawal, Credit Inquiry, Bill Payment, Funds Transfer, Cash Deposit, and so forth.

The creative efforts of ATM developers have yielded useful features that are essentially unique to ATMs. Such devices as bill dispensing mechanisms, integrated keyboard displays, card-capturing devices, magnetic stripe card readers, keyboards for entering secret identification numbers, vandal doors, etc. have gone far in providing a reliable, intelligent terminal.

Nevertheless, operational problems do occur with ATMs. Many of these problems result from the unwillingness or inability of some of the general public to follow the sequential instructions provided by the ATM. For example, the unskilled user of an ATM upon arriving at the ATM may not read, or understand, the instructions telling the user to insert the user's magnetic stripe card into the card reader to activate the terminal and to initiate the sequence of events leading to the completion of a financial transaction. Since the terminal has no indication that a user is present thereat until a card is inserted in the reader, and since the would-be user is unaware of the need to insert a card or where to insert it, a stand-off situation will occur.

Another possible situation may occur in which a user successfully activates the ATM and proceeds partially through the sequential steps of a financial transaction only to walk away for some reason without completing the transaction. In this situation, the ATM, not aware that the user has departed, is in a vulnerable position with its vandal door open awaiting for the user to perform the next data entry. In the usual design of ATMs, internal timing circuitry would eventually cause the transaction to be aborted, the bank card retained, and the vandal door closed. However, since many users are slow and deliberate in using ATMs, the time duration required before the terminal will abort the transaction and secure the vandal door is made quite substantial.

A further possible situation may occur when the user successfully completes the financial transaction (makes a cash withdrawal, for example) and then walks away from the ATM leaving the user's bank card protruding from the card reader. Depending on the design of the ATM, the bank card will remain in the entrance of the card reader until it is withdrawn by the next user, or is recaptured by the card reader after a timeout has occurred. In either event, the bank card will not be in the possession of the account holder.

It is apparent that the above situations, as well as others of a similar kind, could be substantially avoided if the ATM was provided with a method and apparatus that would indicate to it that a would-be user has arrived within a defined user area of the machine and/or that the current user has departed from such defined user area prior to completion of the transaction in process. If the ATM was aware that a would-be user is standing in a user operating zone within the defined user area of the machine but has not inserted a bank card into the card reader, some appropriate form of additional communications, such as a spoken greeting and instruction by means of speech synthesis technology, expanded messages on the visual display, audible tones from the area of the card reader, and so forth, may be used to inform the unskilled user that the user's bank card should be inserted into the card reader to initiate the transaction sequence. The ability of the ATM to be aware that a current user is departing from the user operating zone and the defined user area prior to completion of the current transaction or prior to reclaiming the user's bank card would allow spoken words (speech synthesis) or audible signals to call the user back to finish the transaction or reclaim the user's bank card.

A rather direct means of sensing the presence of a would-be user in a user operating zone of an ATM would be the installation of a switch plate in front of the ATM that is activated by the physical weight of the user. In general, the foregoing is not a really practical solution since the ATMs are typically installed in public places, for example, in bank walls next to public sidewalks, in shopping mall, and in lobbies of public buildings, in which cases the installer of the ATM does not have the freedom to install a switch plate in front of the ATM because of legal restrictions, economic constraints, and concerns for reliability in severe weather.

Other areas of human endeavor have given rise to the need to sense the presence of an object within a defined area, an example being ultrasonic burglar alarms in which a high frequency sound is echoed by the intruder and detected by the alarm device. In this application, the physical presence of the intruder is the primary measurement of concern rather than the specific distance from the alarm to the intruder. In a photographic application, the distance to the nearest object is determined by the travel time of sound waves in order to control the focal setting of the camera lens. In contrast, and as pointed out above, a need exists for a method and apparatus for an ATM that utilizes both the sensing of physical presence of a user as well as the measurement of the distance of the user from the ATM to provide a determination if a user is actually stationary within the user area of the terminal for a sufficient time to be considered a user as compared to a person who is merely walking past the terminal.

In accordance with one embodiment of the invention, a detector system, capable of providing output signals indicative of a user's presence both within a defined user area associated with a user device and a user operating zone within the user area, the user's continued presence therein, the user's movement therein towards or away from the user device, and the user's departure from either the user area of the operating zone, comprises transducer transceiver means, ranging circuit means, distance measuring circuit means coupled to the ranging circuit means, and computer means coupled to the distance measuring circuit means operative to provide the output signals.

SUMMARY OF THE INVENTION

This invention relates to a method and apparatus for detecting the presence of a person within a defined user area associated with a user device and a user operating zone within the user area. More particularly, this invention relates to a method and apparatus for detecting the physical arrival, continued presence, and departure of users from such user area and such user operating zone, thereby allowing application computer programs that are provided within the user device to successfully cope with most problems associated with unpredictable actions of the user not covered by present methods and systems.

It is accordingly an object of the present invention to provide a novel and reliable detector method and apparatus for detecting presence and movement of a user within a defined user area associated with a user device and a user operating zone within the user area.

Another object is to provide a detector method and apparatus for providing electrical output signals, indicative of a user's presence within a defined user area associated with a user device and a user operating zone within the user area, the user's continued presence within the area and zone, the user's movement towards or away from the user device, and the user's departure from either the defined user area or the user operating zone, which may be used to control the operation of the user device, such as an automatic teller machine.

A further object is to provide a detector apparatus which produces output signals indicative of the presence and movement of a user within a defined user area associated with a user device and a user operating zone within the user area, which may be used for controlling the user device, the apparatus including transducer transceiver means, ranging circuit means, distance measuring circuit means, and a computer means for providing the output signals.

With these and other objects, which will become apparent from the following description, in view, the invention includes certain novel features of construction and combinations of parts, one form or embodiment of which is hereinafter described with reference to the drawings which accompany and form a part of this specification.

BRIEF DESCRIPTION OF THE DRAWINGS

FIGS. 7A–7G are flow charts illustrating the use of the detector system of the present invention with an automatic teller terminal wherein a savings withdrawal transaction is described.

DETAILED DESCRIPTION OF THE PREFERRED EMBODIMENT

Figure 1:
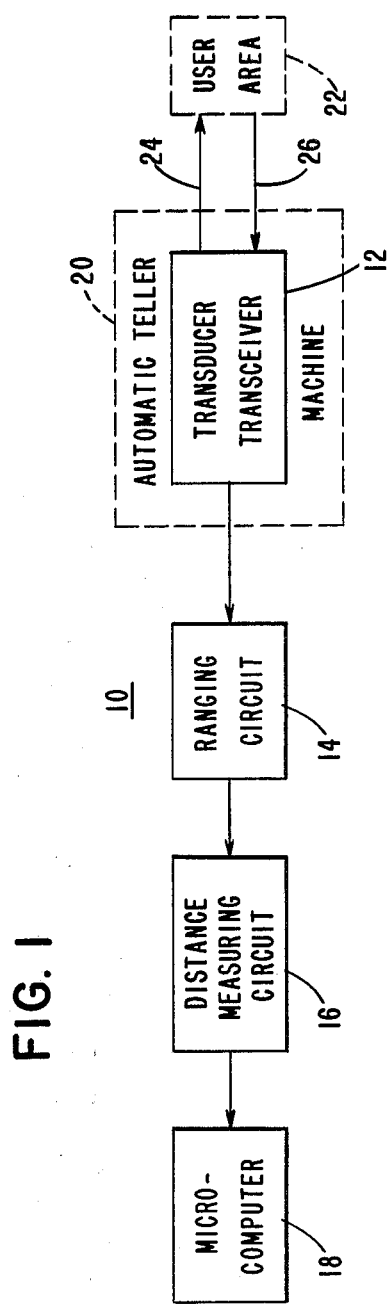
FIG. 1 is a block diagram of the detector system of the present invention.

Referring to FIG. 1, there is shown a block diagram of a detector system 10 constructed in accordance with the present invention. The detector system 10 includes an ultrasonic transducer transceiver 12, serving both as a loudspeaker and microphone, an ultrasonic ranging circuit 14 for controlling the operating mode (transmit/receive) of the transceiver 12, an interface distance measuring circuit 16, and a microcomputer 18. The transceiver 12, ultrasonic measuring circuit 14, and distance measuring circuit 16 are associated with an ATM 20 and they serve to detect the presence and distance of ATM users from the ATM 20 and provide a determination if a user is within a defined or prescribed user area 22 associated with it. In operation, a pulse of radiant energy at 24 is transmitted from the transceiver 12 towards a potential user and the resulting reflected signal at 26 is detected by the ranging circuit 14 which converts the time elapsed between initial transmission of the pulse and echo detection thereof into a distance measurement signal which is supplied to a distance measuring circuit 16. The detector system 10 also includes the microcomputer 18 which utilizes the instantaneous distance measurement supplied thereto from the distance measuring circuit 16 to determine conditions of motion and presence of a user in the defined user area 22 that are considered to be desirable for a given application. The functions of these various components will be subsequently described in detail. While in the preferred embodiment an ultrasonic transducer transceiver 12 is utilized, such transceiver may also, for example, consist of a microwave, VHF, or UHF antenna coupled to appropriate ranging and distance measuring circuits. As a function of the physical layout of the ATM installation, one or two transducers will be required, depending upon the location in which the ATM is installed. If access to the ATM is physically limited, one transceiver may be enough. On the other hand, if access can be from any direction within, say, 180 degrees, two transceivers will be required to cover all possible paths of approach. Subsequent descriptions portray the case of the utilization of two transceivers, except with respect to the flowcharts of FIGS. 5, 6 and 7A–7G.

Figure 2:
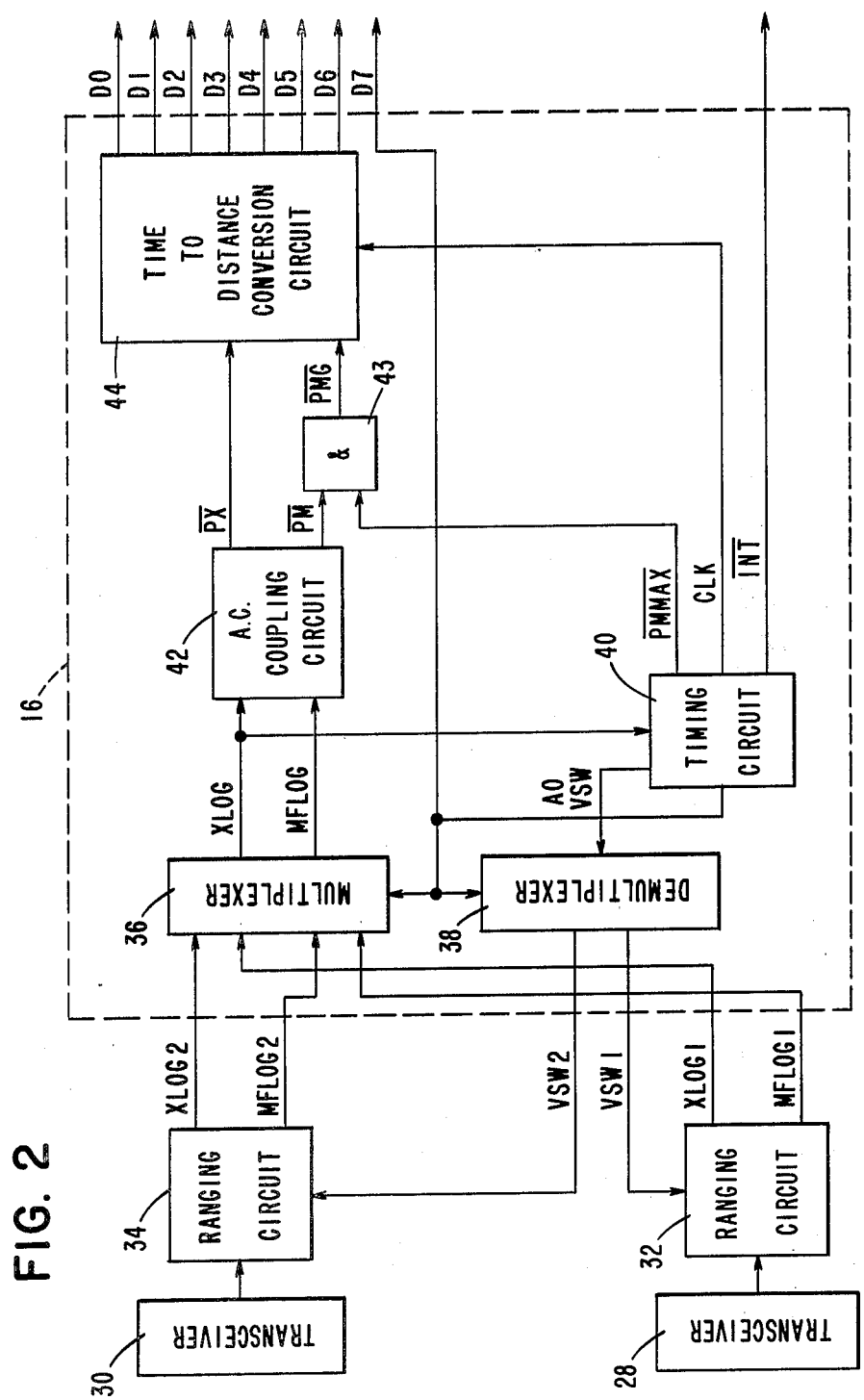
FIG. 2 is a block diagram showing in more detail distance measuring circuit 16 of FIG. 1.

The distance measuring circuit 16 is shown in greater detail in block form in FIG. 2 where two ultrasonic transducer transceivers 28 and 30 are incorporated in the detector system 10 and are coupled to ranging circuits 32 and 34 respectively. The transceivers 28 and 30 and the ranging circuits 32 and 34 preferably may comprise the ranging system manufactured by the Polaroid Corporation which is described in the manual entitled "Ultrasonic Ranging Systems", dated January 1980, of that company.

Figure 3:
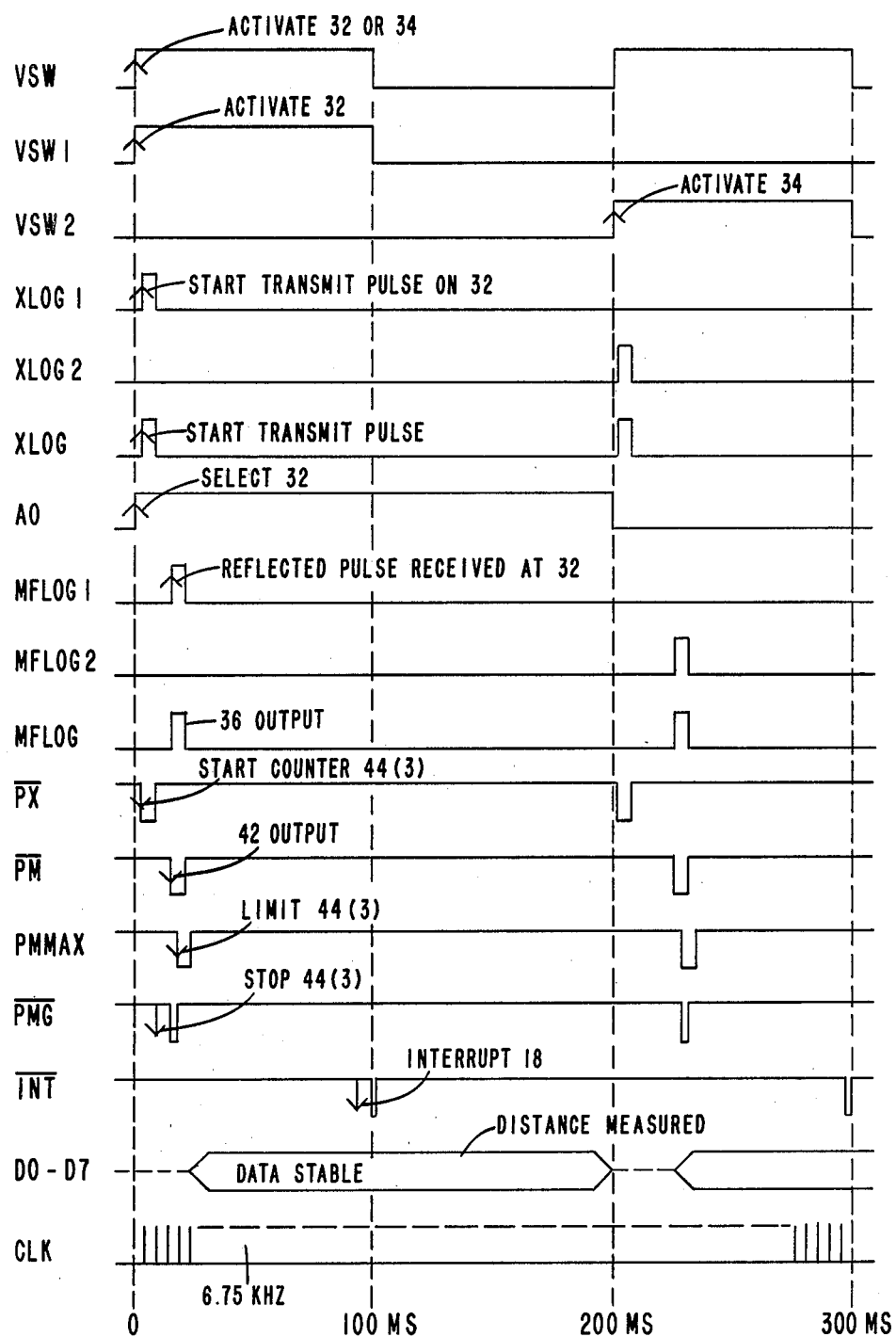
FIG. 3 shows a plurality of waveforms used in the detector system of the present invention.

Referring now to FIGS. 2 and 3, there are shown the three types of logic signals, VSW, XLOG and MFLOG, that are required to couple the ranging circuits 32 and 34 to the distance measuring circuit 16. Specifically, the outputs (XLOG1 and MFLOG1) of the ranging circuit 32 and the outputs (XLOG2 and MFLOG2) of the ranging circuit 34 are each coupled to a multiplexer 36. The outputs (VSW1 and VSW2) of a demultiplexer 38 are coupled to the ranging circuits 32 and 34 respectively. The VSW1 and VSW2 signals activate each of the ranging circuits 32 and 34. A positive going signal on the VSW1 and VSW2 lines initiates a transmit/receive cycle in the ranging system comprising the transceivers 28 and 30 and the ranging circuits 32 and 34. The leading edge of the XLOG1 and XLOG2 signals indicate the start of transmitted pulses by the transceivers 28 and 30 respectively. The leading edge of the MFLOG1 and MFLOG2 signals indicate that the reflected pulses or echoes from a terminal user have been received by the transceivers 28 and 30 respectively.

In FIG. 2, the two transceivers 28 and 30 and their associated ranging circuits 32 and 34 are coupled to the distance measuring circuit 16. The function of the distance measuring circuit 16 is to measure the time window between the signals from each ranging circuit 32 and 34 and convert them to signals indicative of distance.

The distance measuring circuit 16 communicates to the ranging circuit 32 and 34 by means of the signals XLOG1 and XLOG2, MFLOG1 and MFLOG2, and VSW1 and VSW2, as previously set forth, and it commuicates with the microcomputer 18 by means of the logical signals D0 to D7 inclusive and INT. The signals D0 to D6 inclusive indicate a distance value represented as a binary number. The signal D7 indicates which ranging circuit 32 or 34 is active. The signal INT will cause the microcomputer 18 to be interrupted at fixed intervals of time.

The distance measuring circuit 16, as shown in FIG. 2, is composed of the multiplexer 36 which selects signals XLOG1 or XLOG2 and MFLOG1 or MFLOG2 from the ranging circuits 32 or 34 depending on the value assigned to the output signal A0 from a timing circuit 40. An A.C. coupling circuit 42 generates pulses PX and PM from the leading edges of the outout signals XLOG and MFLOG respectively of the multiplexer 36. An AND gate 43 develops a signal PMG resulting from the logic AND of the output signals PM and PMMAX from the A.C. coupling circuit 42 and the timing circuit 40 respectively. Time to distance conversion circuit 44 is provided to convert the time elapsed between leading edges of negative going pulses PX and PMG into distance. Conversion circuit 44 includes a binary counter, which is started with the signal PX is detected, and clock pulses CLK received during the time window between PX and PMG are counted and latched to the output lines for the signals D0 to D7 inclusive.

In order to determine the rate of the clock signal CLK and the range of the binary counter of the conversion circuit 44 for a specific automatic teller machine embodiment, the value for "range" is defined as 0 to 6 feet and the value for resolution is defined as ±1 inch. In the ultrasonic transceivers considered, for a transmitted pulse to leave either of the transducer transceivers 28 or 30, strike a target, that is, a terminal user one foot away, and to return to a transceiver 28 or 30, requires an average time lapse of 1.78 milliseconds. The interval between clock pulses CLK is computed in the following manner, namely, cock period = 1.78 milliseconds/12 inches = 148 microseconds. The binary counter in the time to distance conversion circuit 44 counts the CLK pulses, where each clock pulse corresponds to a distance equivalent to one inch. In order to measure up to six feet the binary counter must be able to count a minimum of 6 feet × 12 inch = 72 CLK pulses. The counter selected for this implementation has a range between 0 and 127. In order to prevent the circuit 44 from accepting echo signals representing distances larger than the maximum distance of six feet, the timing circuit 40 generates the signal pulse PMMAX. This signal pulse PMMAX will appear 10.68 milliseconds after the leading edge of the signal XLOG and it will be effective to stop the binary counter of the conversion circuit 44 for distances larger than six feet.

The timing circuit 40 operates to generate the timing signals VSW, A0, INT, PMAX, and CLK. After power on, the timing circuit 40 generates the following free running clocks: clock signal CLK at 6.756 KHz, activate ranging circuit signal VSW at 5 Hz and select ranging circuit signal A0 at 2.5 Hz. Timing Circuit 40 also generates the pulse INT from the trailing edge of the signal VSW. This pulse is used to interrupt the microcomputer 18 each time a measured distance is available on lines D0–D7. The demultiplexer circuit 38 generates signals VSW1 and VSW2 from signals VSW and A0, activating in this manner either ranging circuit 32 or ranging circuit 34 in an alternate manner at 200 millisecond intervals. When a ranging circuit 32 or 34 has been activated, for example by signal VSW1 for ranging circuit 32, it responds with signal XLOG1 to indicate that a transmit pulse is sent, and with signal MFLOG1 to indicate that a reflected pulse is received. These signals are multiplexed with signals XLOG2 and MFLOG2 from ranging circuit 34 according to thef value assigned to A0. In this example, XLOG1 and MFLOG1 will transfer to the outputs of multiplexer circuit 36 as signals XLOG and MFLOG respectively. These signals are reshaped in the A.C. coupling circuit 42 to the duration and polarity required by the time to distance conversion circuit 44 and appear at its output as signals PX and PM respectively. Also, signal XLOG from the multiplexer 36 is routed to timing circuit 40 which generates pulse PMMAX 10.68 milliseconds after the leading edge of this signal. Signals PMMAX and PM are ANDed together in AND gate 43 whose output signal PMG limits conversion of distances to 6 feet. The time to distance conversion circuit 44 counts the number of CLK pulses appearing between leading edges of signals PX and PMG, and this count is latched onto lines D0–D6. The relative timing of the foregoing signals is shown in FIG. 3.

Figure 2A:
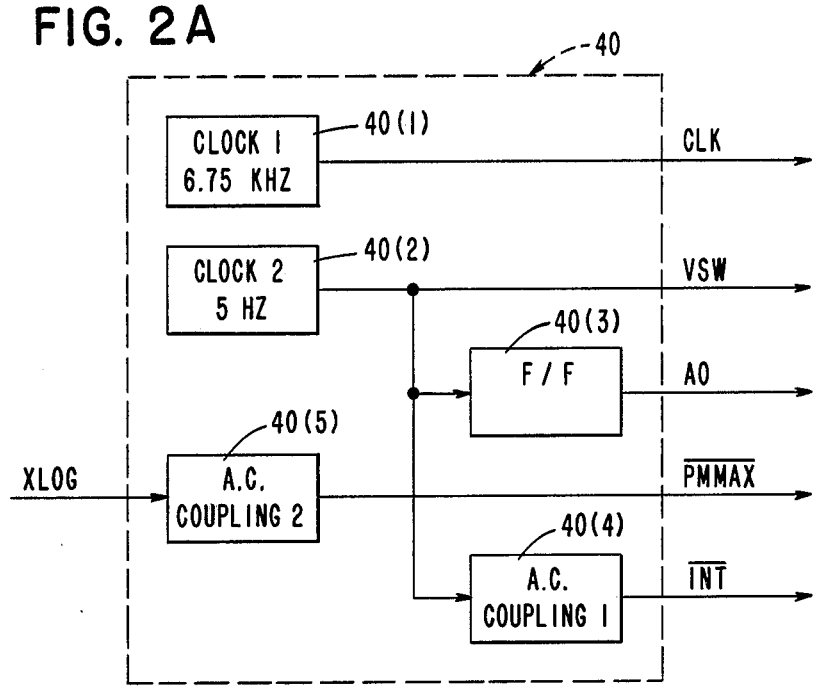
FIGS. 2(A) and 2(B) are block diagrams showing in more detail certain elements of FIG. 2.

FIG. 2A shows the circuit diagram of the timing circuit 40. It comprises a 6.75 KHZ. Clock 1, 40(1), which supplies the clock signals CLK. A 5 HZ. Clock 2, 40(2), supplies the VSW signals and it is also coupled to inputs of a flip-flop 40(3) and an A.C. coupling circuit 40(4). The outputs of the flip-flop 40(3) and coupling circuit 40(4) supply the signals A0 and $\overline{INT}$ respectively. Also, the signal XLOG is supplied to an A.C. coupling circuit 40(5), the output of which is the signal $\overline{PMMAX}$.

Figure 2B:
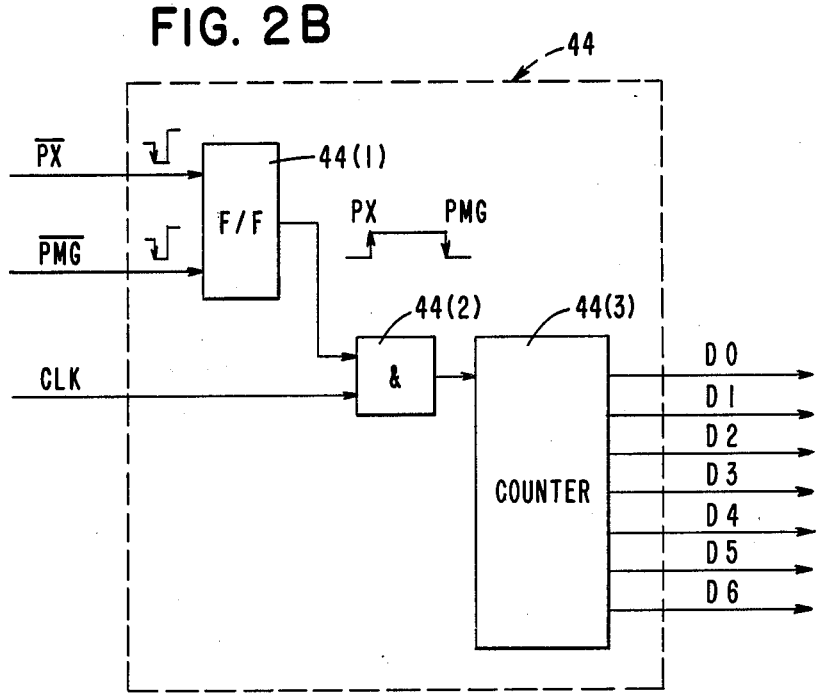

FIG. 2B shows the circuit diagram of the time to distance conversion circuit 44. The signals $\overline{PX}$ from the A.C. coupling circuit 42 and $\overline{PMG}$ from the AND gate 43 are applied to a flip-flop 44(1) whose output is supplied to a NAND gate 44(2). The NAND gate 44(2) is also supplied the clock signals CLK. The output of the NAND gate 44(2) is supplied to a counter 44(3) whose outputs comprise the signals D0 to D6 inclusive. The D0 to D6 signals are coupled to the microcomputer 18 of FIG. 4.

Figure 2C:
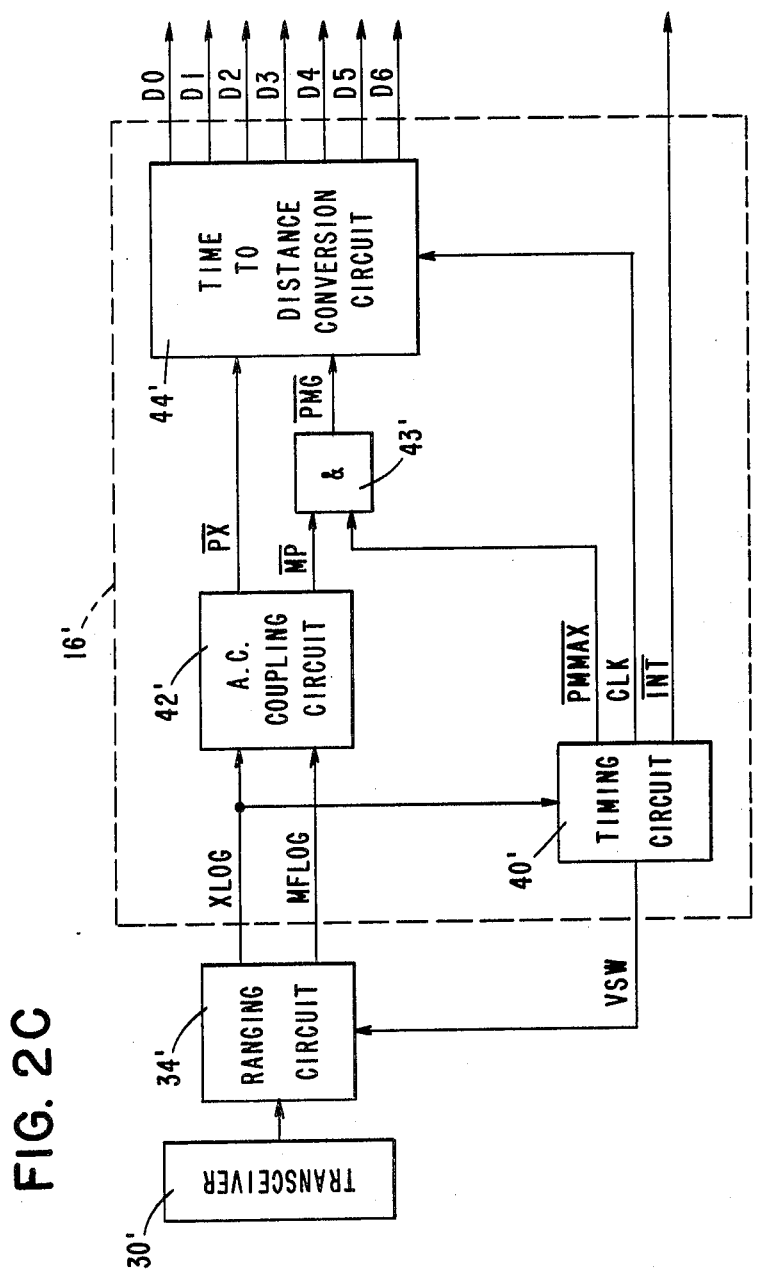
FIG. 2C is an alternate form of distance measuring circuit.

FIG. 2C shows an alternate form of distance measuring circuit 16' in which only one transceiver 30' and associated ranging circuit 34' are employed. In this form, the multiplexer 36 and demultiplexer 38 are not required. The circuit otherwise functions in a manner similar to that described above for FIG. 2.

The following is a listing of the components which may be utilized as an implementation of the distance measuring circuit 16 of FIGS. 2, 2A and 2B, although it will be obvious that equivalent components made by other manufacturers could also be used:

Multiplexer 36: Fairchild, type 74157.
Demultiplexer 38: Fairchild, type 74139.
Timing Circuit 40:
  Clock 40(1); Murata, type CSA, 6.75 KHz, ceramic resonator, hex inverter; Clock 40(2), A.C. Coupling Circuits 40(3) and 40(4), Fairchild, type 9602 multivibrator; and Flip-Flop 40(5) Fairchild type SY/7474D/Flip-Flop.
AC Coupling Circuit 42: Fairchild, type 9602 multivibrator.
AND Gate 43: Fairchild, type 7408.
Conversion Circuits 44:
  Flip-flop 44(1), Fairchild type SY/7474, D/Flip-Flop; NAND Gate 44(2), Fairchild type 7408; and Counter 44(3), Fairchild type 4024B, 7 stage binary counter.

Figure 4:
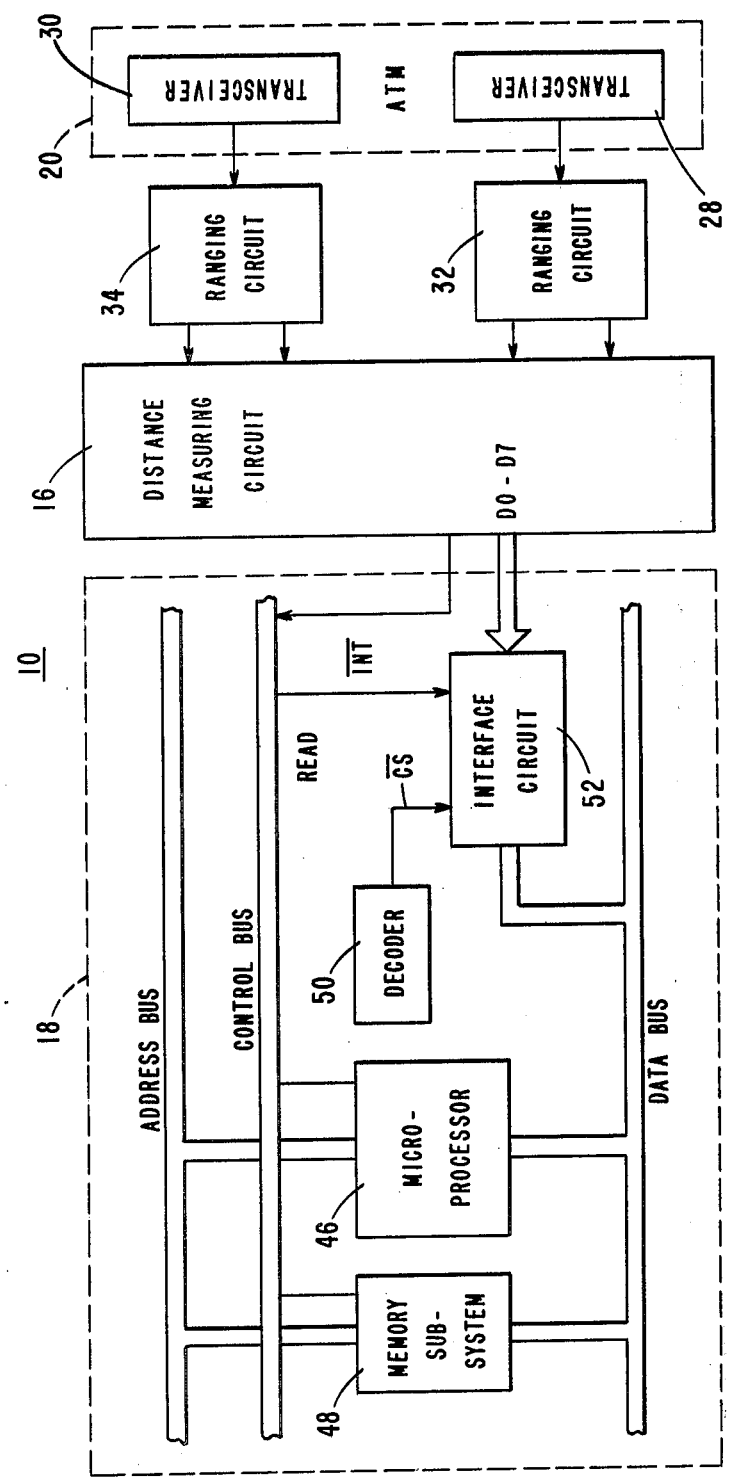
FIG. 4 is a block diagram showing in more detail microcomputer 18 of FIG. 1.

FIG. 4 is a more detailed functional block diagram of the detector system 10 according to the present invention. The microcomputer 18 provides control signals that control operation of the user device or ATM 20 and includes a microprocessor 46, such as the Intel 8085 microprocessor chip, along with suitable elements, as a memory subsystem 48, an address decoder 50, and a peripheral interface circuit 52. Such a typical microprocessor arrangement is well-known in the art, and the details will not be further set forth herein. In operation, the distance measuring circuit 16 provides the distance indicating signals D0 to D6 inclusive in dependence upon the presence of a user at the ATM 20 and it also by means of the signal $\overline{INT}$ interrupts the microcomputer 18. When the microcomputer 18 is interrupted, it will select the peripheral interface circuit 52 and read the signals D0 to D7 inclusive. Signal D7 carries signal A0 (FIG. 3), indicating to the microcomputer 18 which ranging circuit 32 or 34 is active at a given time.

A description of the operation of the detector system 10 will now be made with reference to the flow charts of FIGS. 5, 6 and 7A to 7G inclusive. In this description, it will be assumed that only one transceiver, such as 30, is required. If more than one transceiver is required, the programs are similar to those described above, but of substantially greater complexity. During operation, the microcomputer 18 (FIG. 4) will be interrupted at regular time intervals by the signal $\overline{INT}$ supplied by the distance measuring circuit 16. Each time an interrupt occurs the microcomputer 18 will cease execution of its main computer program and will execute a service routine program to provide control signals that control operation of the user device or ATM. The service routine program for this purpose will now be described with reference to the program shown in the flow chart of FIG. 5.

Figure 5:
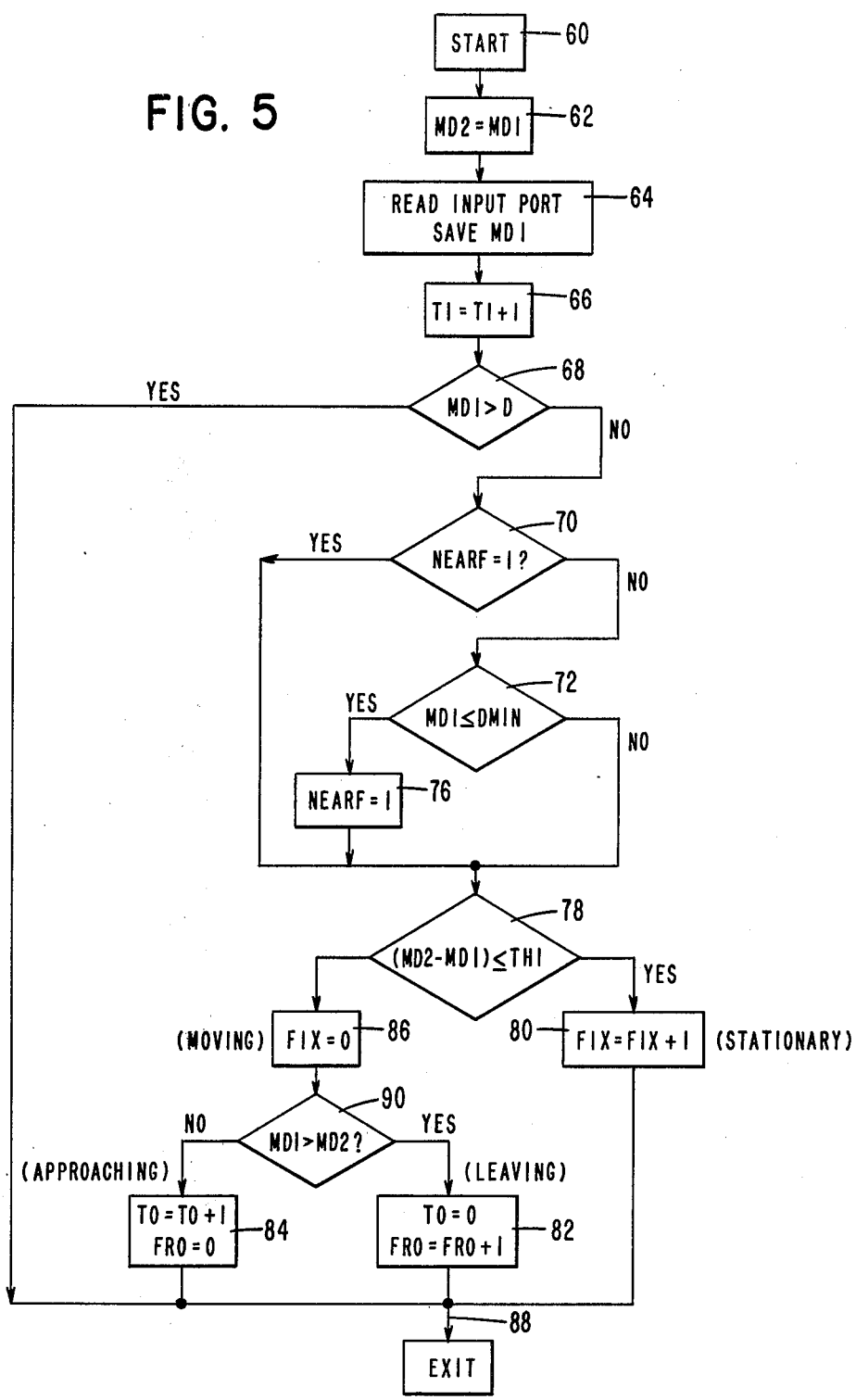
FIG. 5 is a flow chart illustrating operation of the detector system of FIG. 1.

The function of the service routine program of FIG. 5 is to obtain the value of the instantaneous distance of a person from the transceivers 28 and 30, determine if a person is in the defined user area 22 (FIG. 1) of the ATM 20, and compare this distance with previous distance values to determine if the person is approaching, is leaving, or is stationary within the user area 22. It is assumed, for ease of explanation, that the physical layout of the ATM installation is such that only one transducer transceiver is required.

A number of variables are used throughout the following operational description. The global variables are defined in the main program of the microcomputer 18 and are updated by this service routine. The variable TO (steps 82 and 84) represents motion of a person towards the ATM 20 to vary between zero and a value proportional to the time a user is approaching the ATM 20. The variable FRO (also steps 82 and 84) represents motion of a person away from the ATM. FRO varies between $\phi$ and a value proportional to the time that a person is leaving the ATM 20. The variable FIX (steps 80 and 86) represents a stationary person. The variable NEARF (steps 70 and 76) indicates a person has reached his nearest position with respect to the ATM 20 when approaching it. The varible T1 (step 66) represents time. The variable MD1 (step 62) contains the value of the present measured distance from the ATM 20 to a user. The variable MD2 (step 62) contains the value of the previous distance from the ATM 20 to a user. And, the value of D (step 68) represents the distance to the boundary of a defined user area 22 of the ATM 20.

In FIG. 5, step 60 is the entry point of the service routine program, and in step 62 the previous value of the distance is saved in MD2. In step 64, the distance value computed in the distance measuring circuit 16 is read by the microprocessor 46 (FIG. 4) from an input port of its peripheral interface circuit 52 and saved in variable MD1 of its memory subsystem 48. In decision step 68 the value of MD1 is compared to D. If MD1 is greater than D, no person is present in the defined user area 22 of the ATM 20 and the service routine process terminates by exiting via line 88. If MD1 is less than or equal to D, the process proceeds to step 70 where the value of NEARF is compared with 1, and if it is not equal to 1, the process proceeds to step 72. At this point the person has entered the defined user area 22 and is approaching the ATM 20. This is determined by comparing MD1 and DMIN, where DMIN is a value representing the distance to the boundary of a defined user operating area of the ATM 20 (DMIN=36). If MD1 is greater than DMIN, the process continues to step 78. If MD1 is less than or equal to DMIN, the person is positioned in front of the ATM 20 within the user operating zone (three feet fro the ATM 20) in the illustrated embodiment, and is ready to start with a financial transaction. NEARF is set to one, and the process continues to step 78. In step 78, the present distance MD1 of the user from the ATM 20 is compared with the previous distance MD2 of the user from the ATM 20. THI is defined as a small value (THI=2) thereby taking into account small variations in motion of the person. If the absolute value of the difference is smaller than a value THI, the person is stationary and the value of FIX is increased by one in step 80. On the other hand, if this absolute value is larger than THI, the person is moving and the value of FIX is set to zero in step 86. The process continues to decision step 90 where the value of MD2 is compared to the value of MD1. If MD1 is greater than MD2, the person is moving away from the ARM 20 and in step 82 the value of FRO is increased by one, and TO is set to zero. In step 90, if MD2 is greater than MD1, the person is getting closer to the ATM 20 and the values of TO and FRO are adjusted as shown in step 84. This interrupt service routine program exits from line 88 and the detector system 10 continues execution from the main program.

Figure 6:
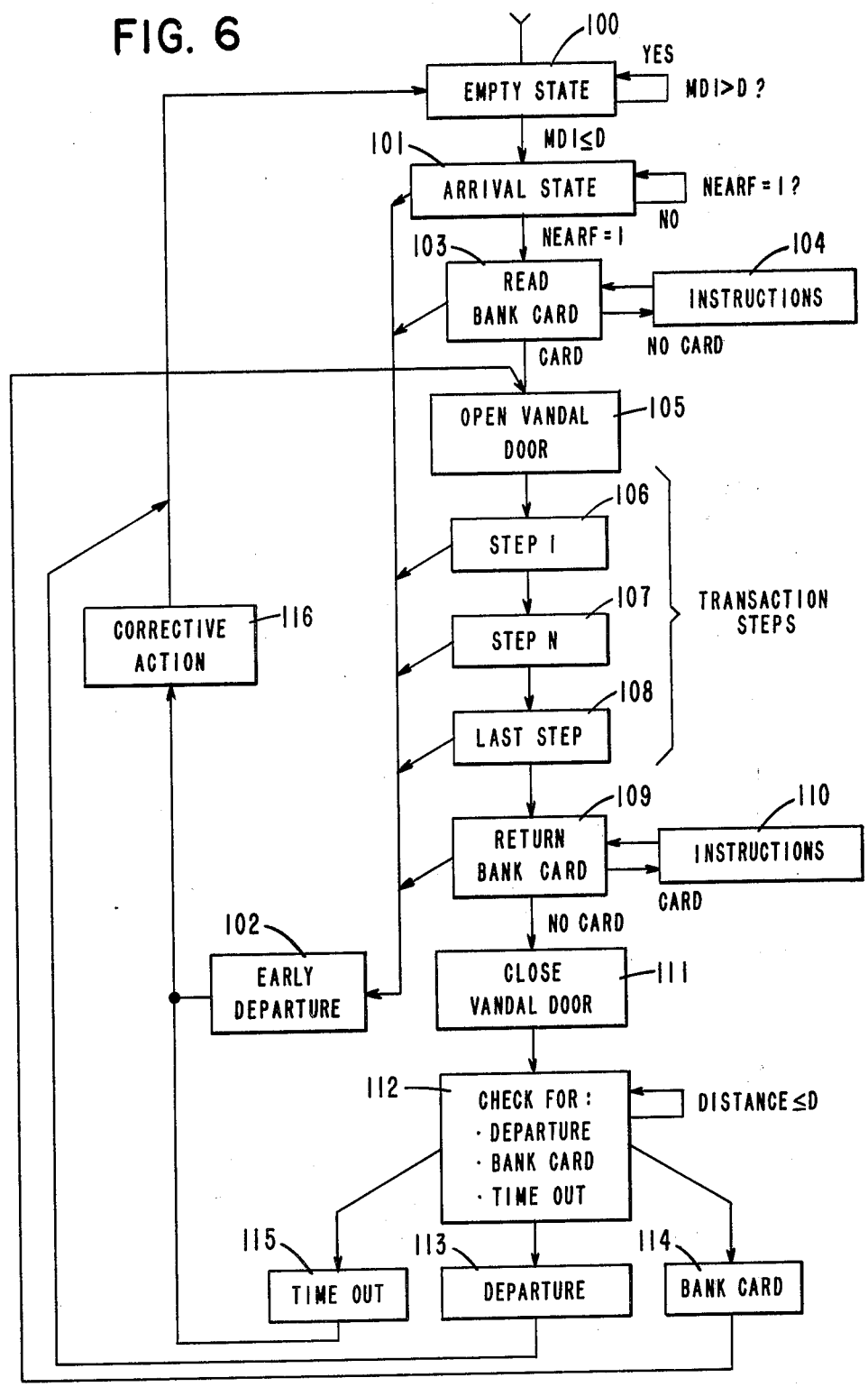
FIG. 6 is a flow chart illustrating the operation of an automatic teller terminal incorporating the detector system of the present invention.

FIG. 6 is a generalized flowchart of the operational characteristics of the ATM 20 incorporating the user detection system 10 of the present invention. The process starts in step 100, EMPTY STATE, and remains in this state as long as no person is detected inside the defined user area 22 of the ATM 20. When a user has entered the defined user area 22, the process enters the ARRIVAL STATE 101 and it will stay in this state until one of these two conditions occur: if the value of distance D1 becomes larger than value D the process continues to step 102, EARLY DEPARTURE, and the user has left the user area 22 of the ATM 20. If the value of NEARF equals one the user has reached the user operating zone of the ATM 20 and the process enrters step 103, READ BANK CARD. As long as the user does not insert his bank card into the card reader within preselected period of time, the process will use additional communication means to inform the user that the card must be inserted and how to do it, if necessary. In addition to expanded messages on the visual display of the ATM 20, audible tones or spoken messages (speech synthesis) may be used to alert and instruct the user. These are represented by steps 103 and 104, INSTRUCTIONS.

When the inserted bank card is detected, the ATM operation continues in a normal manner through the sequential steps of a transaction, represented by steps 105, OPEN VANDAL DOOR, and transaction steps 106, 107 and 108, as long as the user does not leave the defined user area 22 after partially completing the transaction. The constant monitoring of the presence of a user in the defined user area 22 will indicate to the ATM 20 situations where the user has departed the area 22 without completing the transaction. Therefore, the ATM 20 will be capable of calling the user back to the ATM or of starting corrective recovery action in order to abort the transaction in a logical manner. This corrective recovery action is shown in steps 101, 102, 103, 106, 107, 108, and 116, CORRECTIVE ACTION. Some examples of corrective recovery action are retention by the ATM 20 of the bank card, closing of its vandal door, step 111, and retrieving money dispensed and/or receipts back within the ATM 20.

The steps 109, RETURN BANK CARD, and 110 INSTRUCTIONS, represent the situation in which the user successfully completes the transaction, and then walks away from the defined user area 22 leaving his card in the card reader. The addition of audible signals or spoken words (speech synthesis) would alert the user of the need to collect his card or money dispensed. Steps 112, CHECK FOR, and 113, DEPARTURE, represent the normal mode of departure, where the ATM 20 detects that the person retrieves his card and then leaves the defined user area 22. Steps 114, BANK CARD, and 115, TIME OUT, refer to situations where the next user enters the defined user area 22 before the detector system 10 detects that the last user has departed or where the same user starts a new transaction. The system enters step 114 when the user inserts his bank card, in which case the system proceeds to step 105 to open the vandal door. Step 115 is entered when, after a predefined delay, the user has not inserted his bank card or departed from the area 22. In this case the process continues in step 118.

Figure 7A:
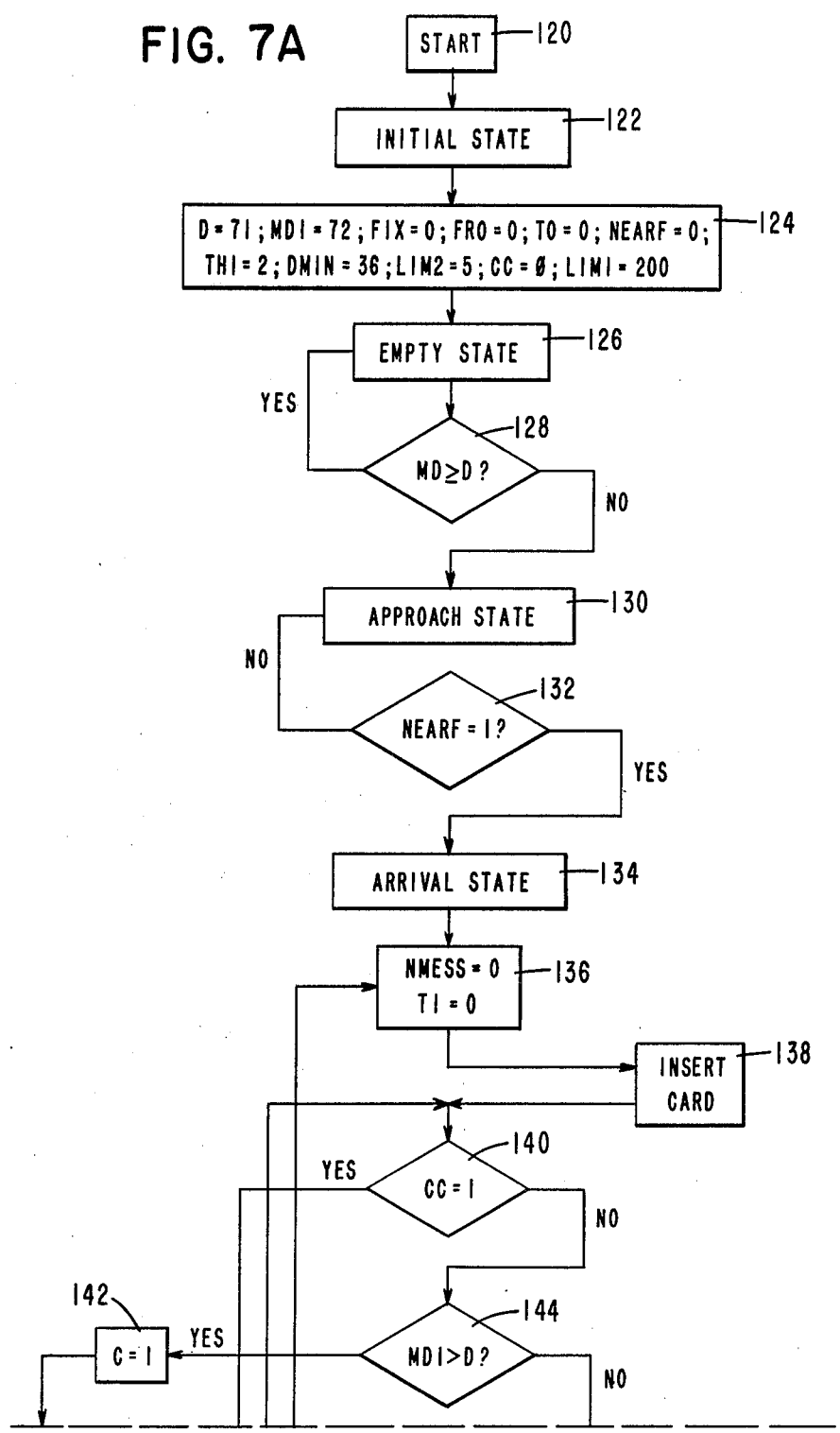
Figure 7B:
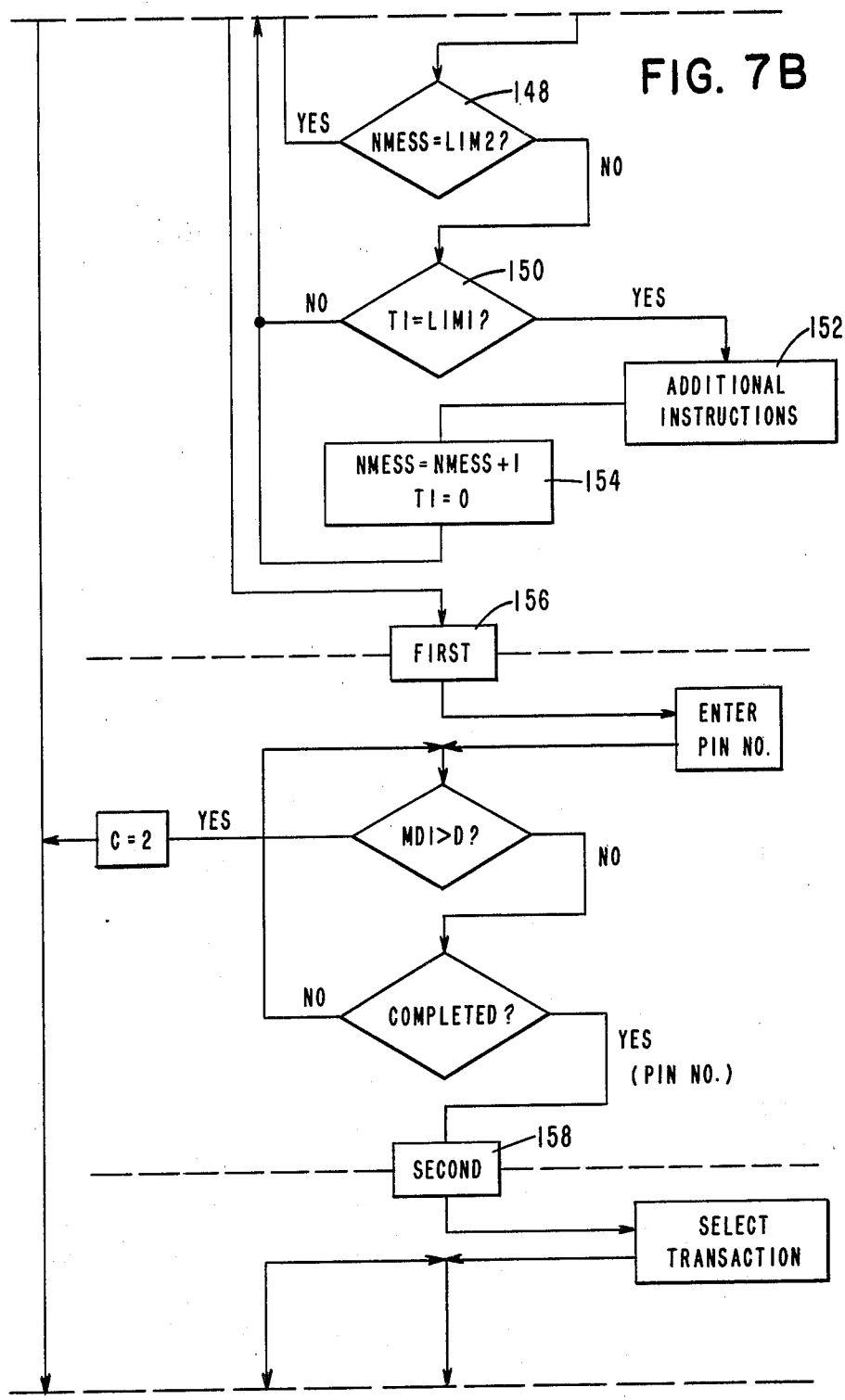
Figure 7C:
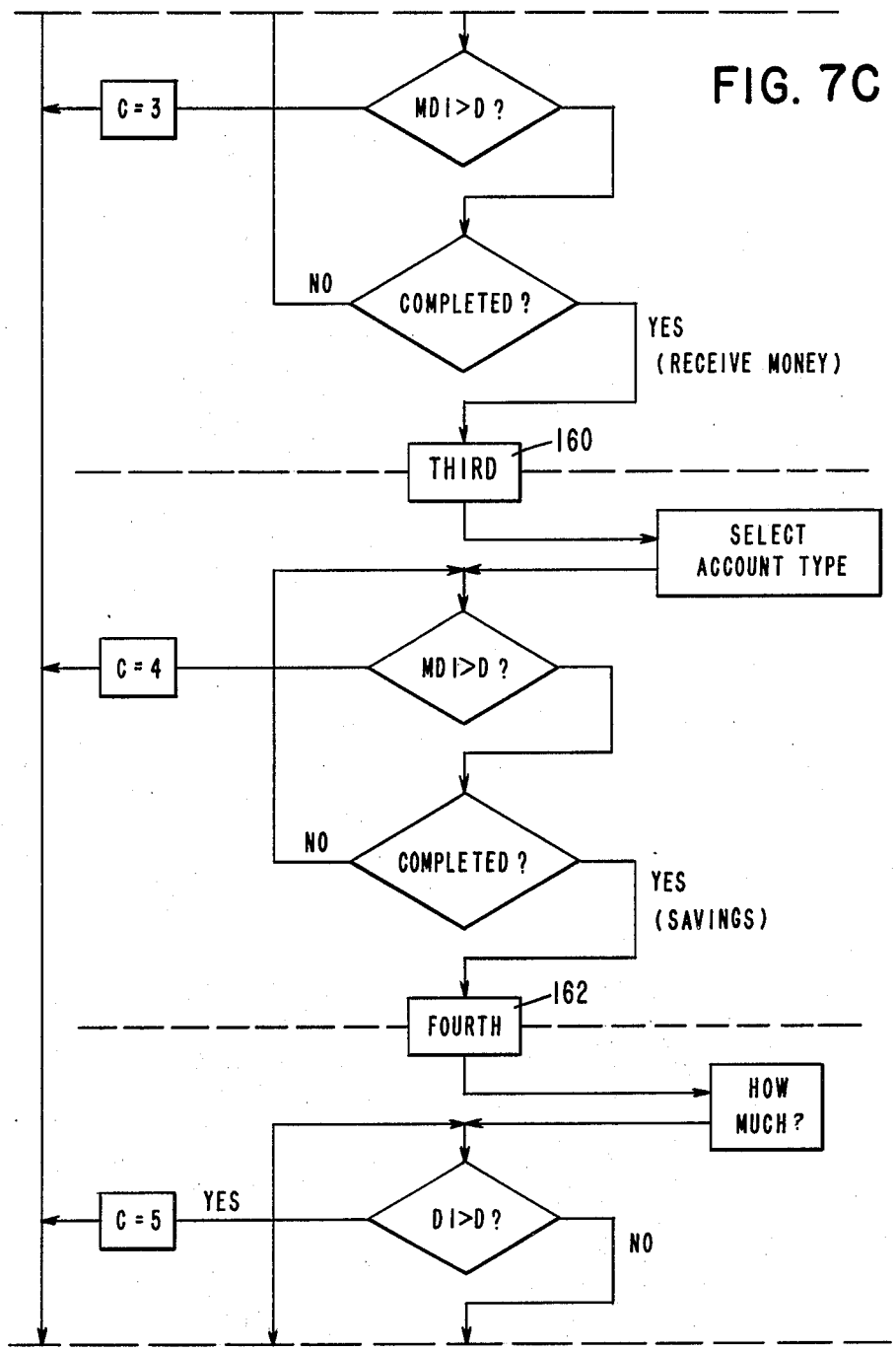
Figure 7D:
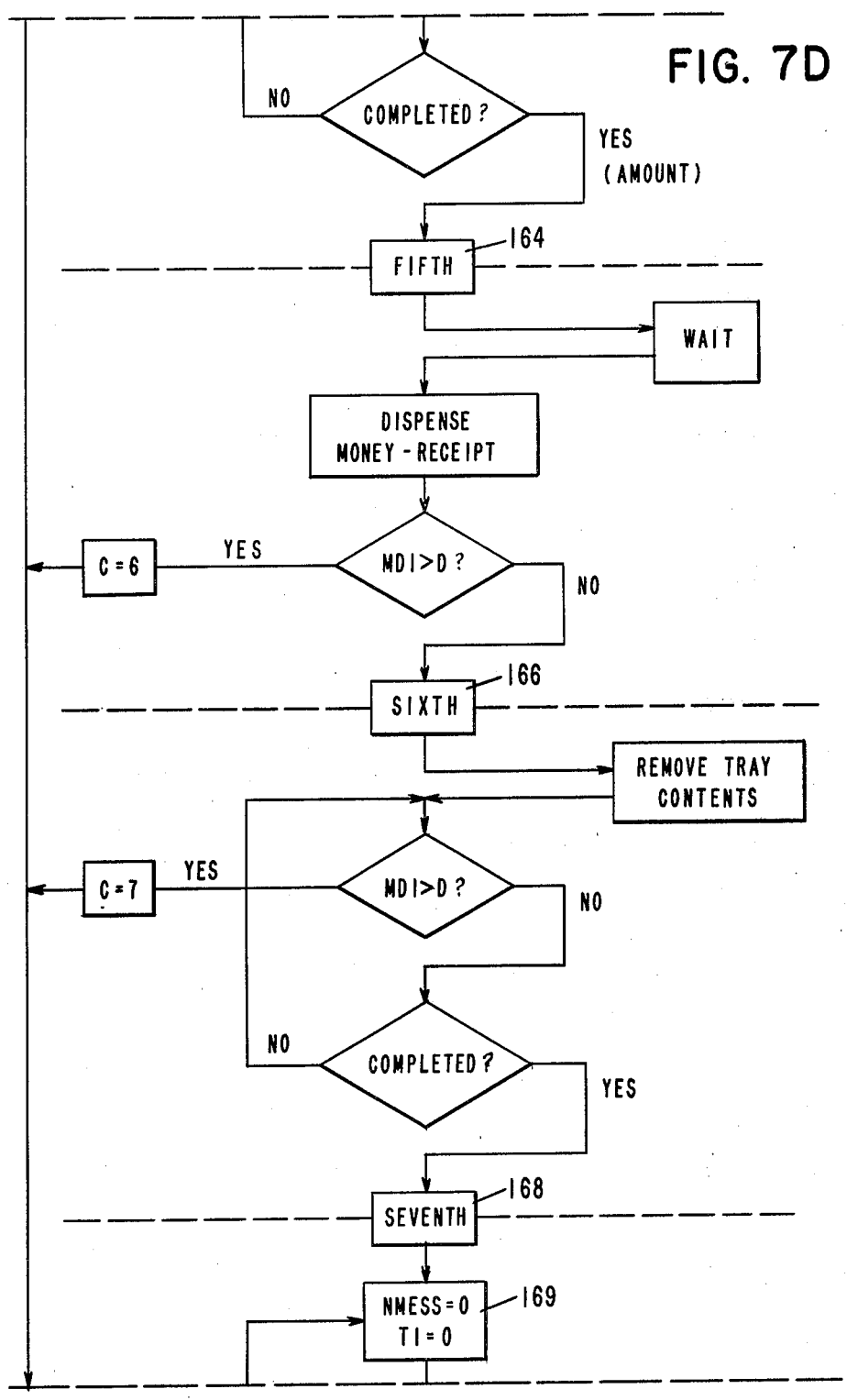
Figure 7E:
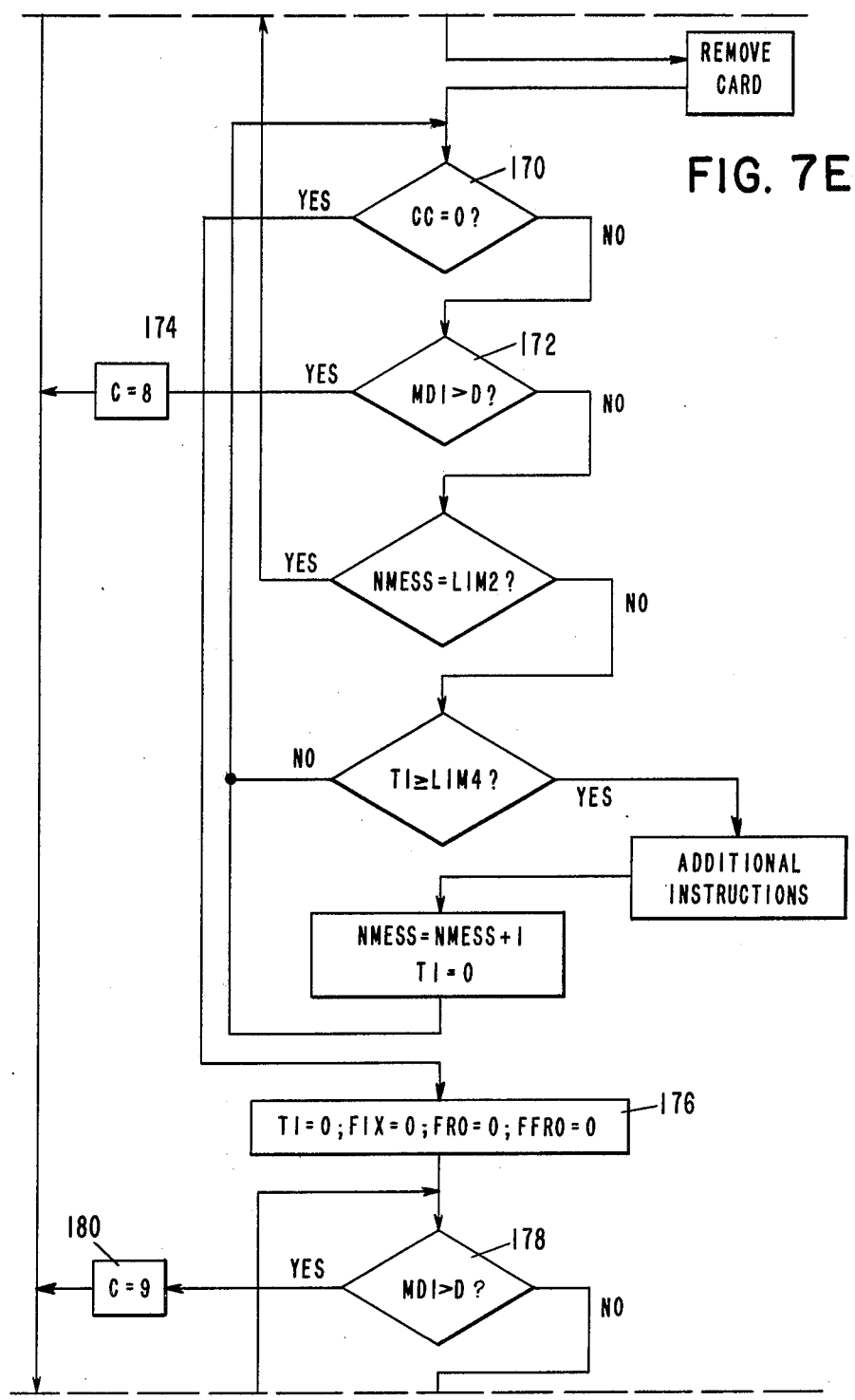
Figure 7F:
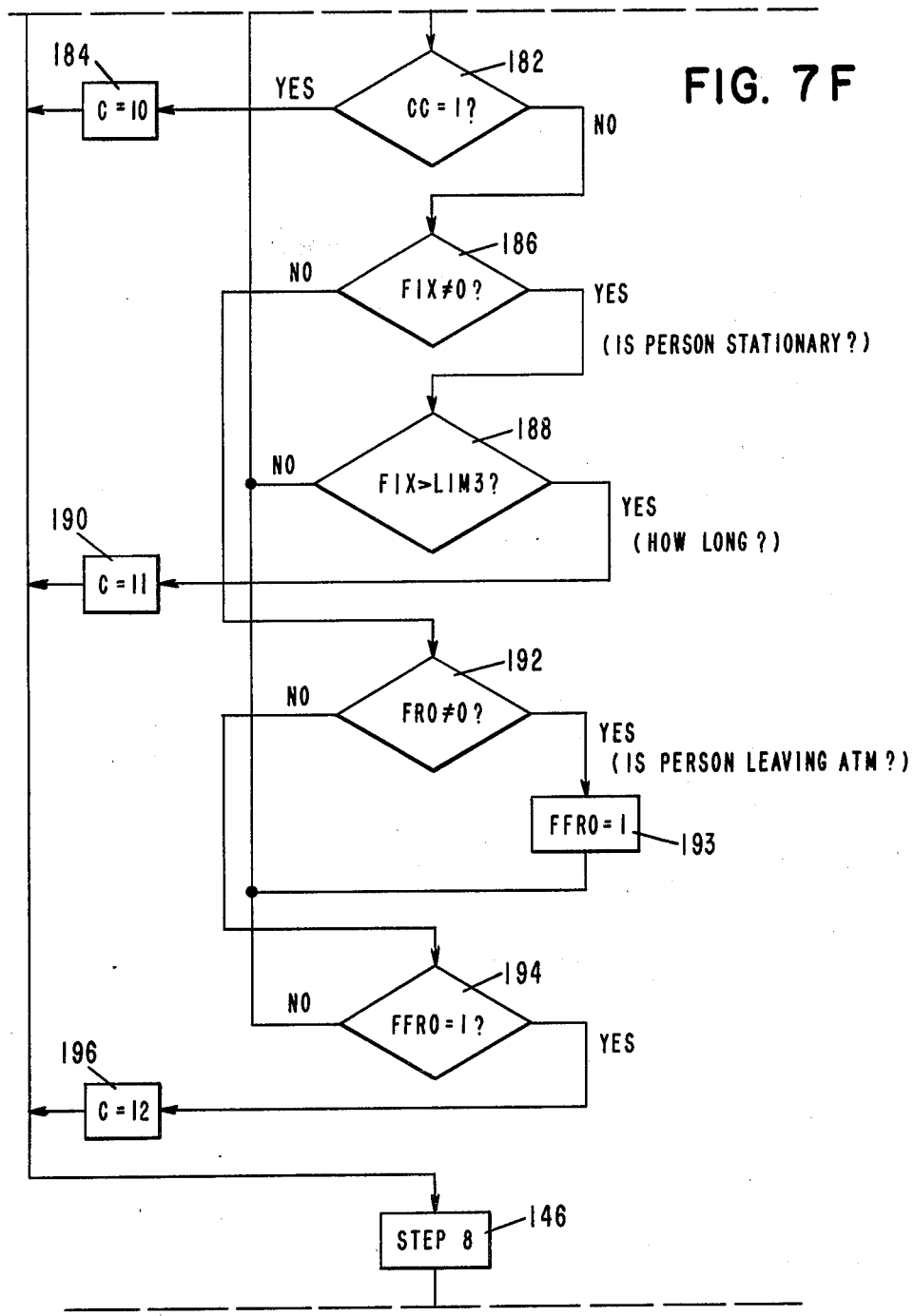

FIGS. 7A to 7G inclusive show further use of the detector system 10 in association with the ATM 20. This example describes a savings withdrawal transaction. The entry point of this procedure is step 120, START, and the process is initiated in step 122, INITIAL STATE, by initialization of the varibles including NEARF, FRO, TO, FIX and DMIN. The assigned values of these variables are shown in 124. NMESS in step 136, represents the message number to be presented to the user. These messages are predefined according to the ATM's facilities to produce them, that is, by a visual display, spoken words (speech synthesis) or audible tones, for example. The number of messages will vary between 0 and LIM2. The process then continues to step 126 (EMPTY STATE), and it will stay in this state as long as the present measured distance MD1 of the user is larger than the maximum distance D. In this EMPTY STATE, there is no user within the defined user area 22 of the ATM 20. When a person enters the defined user area 22, then MD1 is less than or equal to D, step 128, and the process enters step 130, the APPROACH STATE. As long as the user is approaching the ATM 20, which is signified by a value of NEARF equal to zero, the ATM 20 will stay in this state. When the user reaches the operating zone of the ATM 20 (NEARF=1), step 132, the process enters step 134, the ARRIVAL STATE. In this ARRIVAL STATE, the ATM 20 starts step 136 where the variables NMESS and TI are set equal to zero and a message block is displayed (step 138), instructing the user to insert his bank card into the card reader. In step 140, the ATM 20 checks to see if a user bank card has been entered into its card reader. The presence of a card is indicated by a value of variable CC equal to one. If no card is entered, the process will continue to detect or monitor whether the user is still within the user operating zone of the ATM 20. If the user has departed the user operating zone, the process enters step 142 via step 144 where it sets the value of variable C to one and proceeds to 146, step 8, (FIG. 7F). If the user is still in the user operating zone, the process enters step 148 (FIG. 7B) via step 144 where it compares the values of NMESS and LIM2 for equality (meaning that the user has received all instructions available). If the user still has not entered his bank card, the process will return to step 136, the first message will be displayed again, and it will wait for the user to either enter his bank card or leave the defined area 22. This is accomplished by cycling through steps 136, 140, 144 and 148. On the other hand, if in step 148 the values of NMESS and LIM2 are not equal, the process compares the values of T1 and LIM1 in step 150. If T1 is smaller than LIM1, the process keeps looping through steps 140, 144, 148 and 150 until T1 reaches the value LIM1, providing in this manner a delay between messages. Upon this occurrence, the ATM 20 presents the user with the next instruction to inform the user how to initiate the transaction. Step 152 represents message NMESS, and the process continues to step 154 where the message number NMESS is increased by one and the value of T1 is set to zero. The process next returns to step 140.

In step 140, if a user inserts his bank card (CC=1) the process proceeds to step 156 where the FIRST step of a transaction is started. Steps 156, 158, 160 (FIG. 7C), 162, 164 (FIG. 7D) and 166 are normal steps for the savings withdrawal transaction being used as an example. In each of the foregoing steps, instructions are given to the user to execute the step. The continued presence of the person in the defined user area 22 and the user operating zone is monitored by the detector system 10 so that if the person leaves the area 22 before completing the entire sequence of steps in the transaction, then the process assigns a value to the variable C and proceeds to step 8, 146, (FIG. 7F). At 146, the ATM 20 determines the corrective action necessary to recover from the unfinished transaction resulting from the departure of the user from the user area 22.

Once the user has completed the foregoing intermediate steps, the process enters step 168 (FIG. 7D). In step 168, the ATM 20 determines (using a procedure similar to the one followed for inserting the card, step 134) if the user retrieved his card, step 170 (FIG. 7D), or left the user area 22 before removing it, step 172 (FIG. 7D). The flow charts indicate that if a user leaves the user area 22 without retrieving his card, the value C is set to 8 (step 174, FIG. 7E) and the process is directed to 146, step 8 (FIG. 7F). If the user follows the instructions given, the process goes to step 176 (FIG. 7E) indicating the user has successfully completed the transaction but is still in the user area 22 of the ATM 20. The next step 178, determines if the user has left the user area 22 or not. If the user leaves the user area 22, the process proceeds to step 180, sets C=9 and exits to 146, step 8 (FIG. 7F). This is the normal exit of the user. If, on the other hand, the user is still in the user area 22, the process determines if a bank card has been entered into the ATM 20, step 182, (FIG. 7F). If such is the case, the process sets C=10 (step 184) and exits to 146, step 8 (FIG. 7F). This last situation may correspond to a user having multiple accounts, and after finishing a transaction starts a new transaction on a different account.

If no bank card is detected in step 182, the process will determine if the user is stationary or in motion (step 186). If the user is stationary, the process determines how long the user has been in the same place (step 188). If the user has been stationary for an interval LIM3 since removing the card from the ATM 20, the process sets C=11 (step 190) and exits to 146, step 8 (FIG. 7F). If the user is in motion, the process proceeds from step 186 to step 192, where it determines if the user is moving away from or closer to the ATM 20. If the user is moving away from the ATM 20, the process sets FFRO=1 (step 194) and returns to step 178 (FIG. 7E). If in step 192, the user is getting closer to the ATM 20, then step 194 determines if an overlapping condition exists where a new user is entering the user area 22 before the prior user has cleared it. If this is the situation, the process sets C=12 (step 196) and exits to 146, step 8 (FIG. 7F). In 146, step 8, if the value of variable C is 1, 9, 11 or 12 the process continues to close vandal door (step 202) and proceeds to step 122, INITIAL STATE (FIG. 7A). If C is equal to 2, 3, 4, 5 or 8 the process goes to step 200, RETAIN CARD, where it retains the bank card, and it continues to close the vandal door (step 202, CLOSE VANDAL DOOR) returning to step 122. If C equals 6 or 7, the process enters step 198, RETURN MONEY TO ATM, where it returns money and/or receipts to the ATM and, as before, continues through steps 200, 202 and back to step 122. If C is equal to 10, the process returns directly to step 156 of FIG. 7B.

Card reading and retention means suitable for use in an automated teller machine are disclosed in U.S. Pat. No. 4,007,356, issued Feb. 8, 1977, inventors A. W. Stucke et al., assigned to the assignee of the present application. A user access compartment for currency dispensing suitable for use in an automated teller machine is disclosed in U.S. Pat. No. 3,957,173, issued May 18, 1976, inventor M. T. Roudebush, assigned to the assignee of the present application.

While the form of the invention illustrated and described herein is particularly adapted to fulfill the objects aforesaid, it is to be understood that other and further modifications within the scope of the following claims may be made without departing from the spirit of the invention.

We claim:

1. A detector apparatus for providing control signals for controlling operation of an automatic teller machine comprising: determining means for determining whether or not a user is present within a defined user area associated with said machine and a user operating zone within said user area, said determining means comprising distance measurement means for providing distance indicating electrical signals indicative of the instantaneous distance of said user from said machine, and a computer means coupled to said distance measurement means for receipt of said distance indicating electrical signals to provide said control signals in response thereto.

2. The detector apparatus of claim 1 wherein said distance measurement means comprises transducer transceiver means for transmitting radiated energy into said defined user area and for receiving reflected radiated energy when reflected from said user, ranging circuit means coupled to said transducer transceiver means responsive to said reflected radiated energy to provide presence indicating electrical signals indicative of the presence of said user within said user area and said user operating zone, and distance measurement circuit means coupled to said ranging circuit means for providing said distance including electrical signals.

3. A detector apparatus for an automatic teller machine for providing output signals indicative of a user's presence both within a defined user area associated with said machine and a user operating zone within said user area, the user's continued presence within said user area and said user operating zone, the user's movement within said user area towards or away from said machine, and the user's departure from either said user area or said user operating zone, comprising:

transducer transceiver means for transmitting radiated energy into said user area and for receiving reflected radiated energy when reflected from a user in said user area;

ranging circuit means coupled to said transducer transceiver means responsive to said reflected radiated energy to provide first electrical signals indicative of the presence of said user in said user area;

distance measuring circuit means coupled to said ranging circuit means responsive to said first electrical signals to provide second electrical signals indicative of the instantaneous distance of said user within said user area from said machine; and a computer means couupled for receipt of said second electrical signals from said distance measuring circuit means operative to provide said output signals.

4. The detector apparatus of claim 3 wherein said radiated energy and said reflected radiated energy are in the ultrasonic range.

5. The detector apparatus of claim 3 wherein said first electrical signals comprise a plurality of pairs of electrical signals, one electrical signal of each of said pairs indicating the time of starting of said transmitting radiated energy into said defined area, and the other electrical signal of each of said pairs indicating the time of said reception of said reflected radiated energy.

6. The detector apparatus of claim 5 wherein said distance measuring circuit means includes selection means for successively selecting pairs of said first electrical signals, and timing means for controlling said selection means.

7. A detector apparatus for an automatic teller machine for providing output signals indicative of a user's presence within a defined user area associated with said machine and a user operating zone within said user area, the user's continued presence within said user area and said operating zone, the user's movement within said user area towards or away from said machine, and the user's departure from either said user area or said operating zone, comprising:

a pair of transducer transceiver means for transmitting radiated energy into said user area and for receiving reflected radiated energy when reflected from a user in said user area;

first ranging circuit means coupled to one of said transducer transceiver means;

second ranging circuit means coupled to the other of said transducer transceiver means;

each of said first and second ranging circuit means being responsive to said reflected radiated energy to provide first electrical signals indicative of the presence of said user in said user area;

distance measuring circuit means coupled to each of said first and second ranging circuit means responsive to said first electrical signals to provide second electrical signals indicative of the instantaneous distance of said user within said user area from said machine; and computer means coupled for receipt of said second electrical signals from said distance measuring circuit means operative to provide said output signals.

8. The detector apparatus of claim 7 wherein said radiated energy and said reflected radiated energy are in the ultrasonic range.

9. The detector apparatus of claim 7 wherein said distance measuring circuit means includes selection means for successively selecting desired said first electrical signals, and timing means for controlling said selection means.

10. A method of controlling operation of an automatic teller machine comprising the steps of: determining whether or not a user is present in a defined user area associated with said machine and a user operating zone within said user area by obtaining a distance measurement of said user from said machine as a result of transmitting radiated energy into said user area and receiving reflected radiated energy as reflected from said user, and controlling said operation in response to said determination.

11. An automatic bank teller machine comprising:

determining means for determining whether or not a machine user is present within a defined user area associated with said machine and a user operating zone within said user area, said determining means comprising distance measurement means for providing distance indicating electrical signals indicative of the instantaneous distance of said machine user from said machine, and a computer means coupled to said distance measurement means for receipt of said distance indicating electrical signals to provide control signals in response thereto; and corrective action means controlled by said determining means to cause said machine to recover from an unfinished transaction resulting from the premature departure of a user from the defined user area.

12. An automatic bank teller machine comprising:

determining means for determining whether or not a machine user is present within a defined user area associated with said machine and a user operating zone within said user area, said determining means comprising distance measurement means for providing distance indicating electrical signals indicative of the instantaneous distance of said machine user from said machine, and a computer means coupled to said distance measurement means for receipt of said distance indicating electrical signals to provide control signals in response thereto; and bank card reading and retention means capable of receiving a bank card from a user in connection with the performance of a transaction by said machine, and further capable of performing a card retention operation under control of said determining means if the user leaves the user area without reclaiming the bank card.

13. An automatic bank teller machine comprising:

determining means for determining whether or not a machine user is present within a defined user area associated with said machine and a user operating zone within said user area, said determining means comprising distance measurement means for providing distance indicating electrical signals indicative of the instantaneous distance of said machine user from said machine, and a computer means coupled to said distance measurement means for receipt of said distance indicating electrical signals to provide control signals in response thereto; and currency dispensing means capable of dispensing currency to a pre-release position in said machine and subsequently releasing said currency to the user, said currency dispensing means being controllable by said determining means to abort the subsequent release of currency from said pre-release position to cause said machine to recover from an unfinished transaction resulting from the premature departure of a user from the defined user area.

14. A method of detecting events of presence of a user within a defined user area associated with an automatic teller machine and a user operating zone within said user area, the user's continued presence within said user area and said operating zone, the user's movement within said user area towards or away from said machine, and the user's departure from either said user area or said operating zone, comprising the steps of:

- transmitting radiated energy into said user area;
- receiving reflected radiated energy when reflected from a user in said user area;
- developing first electrical signals indicative of the presence of said user in said user area in response to said reflected radiated energy;
- developing second electrical signals indicative of the instantaneous distance of said user within said user area from said machine in response to said first electrical signals; and
- developing output signals indicative of said events in response to said second electrical signals.

15. The method of claim 14 wherein the step of developing said second electrical signals includes the steps of:
- continuously selecting each successively occurring pair of said first electrical signals; and
- continuously applying said selected pairs of said first electrical signals to distance measuring circuit means.

16. The method of claim 14 wherein all of the steps thereof are performed continuously such that said user's presence and movement in said user area and said user operating zone are constantly detected.

17. A method of detecting events of presence of a user within a defined user area associated with a user device and a user operating zone within said user area, the user's continued presence within said user area and said operating zone, the user's movement within said user area towards or away from said user device, and the user's departure from either said user area or said operating zone, comprising the steps of:
- transmitting radiated energy into said user area;
- receiving reflected radiated energy when reflected from a user in said user area;
- developing first electrical signals indicative of the presence of said user in said user area in response to said reflected radiated energy;
- developing second electrical signals indicative of the instantaneous distance of said user within said user area from said user device in response to said first electrical signals;
- developing output signals indicative of said events in response to said second electrical signals; and
- performing a corrective recovery action in response to the development of said output signals which indicate premature departure of the user from the user area.

18. The method of claim 14 wherein the steps of transmitting radiated energy into said user area and receiving reflected radiated energy when reflected from a user in said user area are performed by a pair of transducer receiver means, the step of developing said first electrical signals is performed by a ranging circuit means coupled to each of said transducer receiver means, the step of developing said second electrical signals is performed by distance measuring circuit means, and the step of developing said output signals is performed by computer means.

19. The method of detecting events of presence of a user within a defined user area associated with an automatic teller machine and a user operating zone within said user area, the user's continued presence within said user area and said operating zone, the user's movement within said user area towards or away from said machine, and the user's departure from either said user area or said user operating zone, comprising the steps of:
- transmitting radiated energy into said user area by a pair of transducer transceiver means;
- receiving by each of said pair of transducer transceiver means reflected radiated energy when reflected from a user in said user area;
- developing by a pair of ranging circuit means a plurality of pairs of successively occurring first electrical signals, one electrical signal of each of said pairs indicating the time of starting of said transmitting radiated energy of said transmitting step, and the other electrical signal of each of said pairs indicating the time of reception of said reflected radiated energy of said receiving step;
- developing second electrical signals indicative of the instantaneous distance of said user within said user area from said machine in response to said plurality of pairs of first electrical signals; and
- developing output signals indicative of said events in response to said second electrical signals.

20. The method of claim 19 wherein the step of developing said second electrical signals includes the steps of:
- continuously selecting each said pair of successively occurring first electrical signals provided by each of said ranging circuit means; and
- continuously applying said selected pairs of said first electrical signals to time to distance conversion means.

* * * * *

UNITED STATES PATENT OFFICE
CERTIFICATE OF CORRECTION

Patent No. 4,420,751      Dated Dec. 13, 1983

Inventor(s) Bruno Paganini et al.

It is certified that error appears in the above-identified patent and that said Letters Patent are hereby corrected as shown below:

Column 3, lines 8 thru 20 inclusive, delete.

Column 3, after line 35 insert following two paragraphs:

--In accordance with one embodiment of the invention, a detector apparatus for providing control signals for controlling operation of an automatic teller machine comprises determining means for determining whether or not a user is present within a defined user area associated with said machine and a user operating zone within said user area, said determining means comprising distance measurement means for providing distance indicating electrical signals indicative of the instantaneous distance of said user from said machine, and a computer means coupled to said distance measurement means for receipt of said distance indicating electrical signals to provide said control signals in response thereto.

UNITED STATES PATENT OFFICE
CERTIFICATE OF CORRECTION

Patent No. 4,420,751          Dated   Dec. 13, 1983

Inventor(s)    Bruno Paganini et al.

It is certified that error appears in the above-identified patent and that said Letters Patent are hereby corrected as shown below:

In accordance with a second embodiment of the invention, a method of controlling operation of an automatic teller machine comprises the steps of: determining whether or not a user is present in a defined user area associated with said machine and a user operating zone within said user area by obtaining a distance measurement of said user from said machine as a result of transmitting radiated energy into said user area and receiving reflected radiated energy as reflected from said user, and controlling said operation in response to said determination.--

Column 12, line 55 delete "including" and substitute
--indicating--.

Signed and Sealed this

Fifteenth  Day of  May 1984

[SEAL]

Attest:

GERALD J. MOSSINGHOFF

Attesting Officer       Commissioner of Patents and Trademarks